United States Patent [19]

Hefele

[11] Patent Number: 5,759,626
[45] Date of Patent: Jun. 2, 1998

[54] PROCESS FOR THE RASTER-FORMED COATING OF WEB-SHAPED FLEXIBLE FLAT ARTICLES WITH HOT-MELT ADHESIVES

[75] Inventor: Josef Hefele, Gräfelfing, Germany

[73] Assignee: Kufner Textilwerke GmbH, Munich, Germany

[21] Appl. No.: 612,566

[22] Filed: Mar. 8, 1996

[30] Foreign Application Priority Data

Mar. 10, 1995 [DE] Germany .................. 195 08 744.5
Sep. 1, 1995 [DE] Germany .................. 195 32 387.4

[51] Int. Cl.$^6$ ................................................ B05D 1/36
[52] U.S. Cl. .................. 427/265; 118/255; 118/266; 118/406; 118/419; 427/282; 427/407.1; 427/430.1
[58] Field of Search ........................ 427/265, 282, 427/407.1, 430.1; 118/255, 266, 406, 419

[56] References Cited

PUBLICATIONS

Sroka, *Handbook of Textile Fixing Inlays*, pp. 131–136 (1993), 3rd Expanded Edition. (No Month Avail.).

*Primary Examiner*—Bernard Pianalto
*Attorney, Agent, or Firm*—Scully, Scott, Murphy & Presser

[57] ABSTRACT

This invention describes a process and an apparatus for the raster-formed coating of web-shaped flexible flat articles (3) with hot-melt adhesives in a screen printing process by filling all perforations of a rotary screen printing stencil (1) by means of an outer blade (6) with a solution or dispersion of a paste (2), by placing the flat article (2) on the rotary screen printing stencil (1) and by subsequently additionally applying a paste (5) by means of an inner blade (4). On the finished product, paste (2) produces a plastic base layer which is not or only slightly capable of thermal activation and paste (5) produces a hot-melt adhesive top layer which is easily capable of being thermally activated. Following the drying and sintering of the double-layered printed flat article (8), it can be used as an attachable inlay material for items of clothing.

7 Claims, 3 Drawing Sheets

PROCESS FOR THE RASTER-FORMED COATING OF WEB-SHAPED FLEXIBLE FLAT ARTICLES WITH HOT-MELT ADHESIVES

This invention relates to a process and an apparatus for the raster-formed coating with hot-melt adhesives of web-shaped flexible flat articles, in particular inlay materials for clothing. The coating consists of two superimposed raster layers: a base layer which is not or only slightly capable of thermal activation and a top layer of thermally activatable hot-melt adhesive having a higher capability to flow in the melted state than the base layer. Both layers are printed in a screen printing process using pastes and form a raster-formed double coating.

Double coating processes which have already become known are described in "Handbuch der textilen Fixiereinlagen" (Handbook of textile fixing inlays) by Sroka, 3rd expanded edition, 1993, pages 131 to 136. Of the four processes described, the only one used in practice today is the point-flow-process in which the paste point is sprinkled with hot-melt adhesive powder onto an inlay web with a rotary screen printing stencil and the excessive powder which does not remain adhered to the imprint is removed by shaking, blowing and suction. The disadvantage of this process is that sprinkled powder also adheres beyond their overlay surface on the carrier at the edges of the printing points and that the finest granulate powder between the printed points can only be removed with difficulty. Certain grip stiffening and return movement tendencies are thus unavoidable.

The additionally described double powder point process operates according to the gravure process with two conical blades placed sequentially on a gravure roller. In order to be able to carry out this process, two mutually adapted different hot-melt adhesive powder types are required which are released from the gravure indentations under the same temperature conditions of the gravure and heating rollers, which considerably limits the applicability of the process. Additionally, it is unavoidable in this case that the powder in the gravure indentations and in the powder bed are mixed in an uncontrolled manner ahead of the second blade. This process has therefore hardly been used.

A double paste point process has also already been described in which two different pastes are printed and superimposed by means of a rotary screen printing stencil and two inner blades. A satisfactorily operating embodiment could not be found up to now for this process and this has therefore also not yet found use in practice.

A roll coater coating process which was practised for some time is finally also described in the above-mentioned handbook. In a first operational step, a screen printing paste coating of the base layer is carried out and in a second operational step, the dried and sintered paste points of the base layer with the domes are dipped into a very even film of a hot-melt adhesive dispersion or solution on the roller surface of a roll coater. The disadvantage of the process consists in that fine rasters are unsuitable for this, a high precision is demanded in terms of the evenness of the film formed on the roll coater and the machine and production technology input is very high.

In the most recent times, the idea has been taken up again to produce the double layer structure in such a manner that two exactly the same round stencils are arranged very precisely in series at a distance from one another and that the base layer is applied with the first and the top layer with the second stencil. The extremely high demands placed in realizing the displacement-free positioning of all printed points with the two superimposed screen stencils means that there is hardly a chance that it is possible to carry out this method at least in the field of fine rasters.

The object of the present invention therefore consists in finding a simple and reliably usable, rationally operating method for double coating which requires modest increased input in terms of machines in comparison to simple coatings, which is precise and capable of easily being carried out for very fine raster points, avoids grip stiffening and possibly also expands the area of application of the double coating process.

Surprisingly, this can be achieved with a suitably modified double paste point process. With reference to

DESCRIPTION OF THE DRAWINGS

FIG. I: illustrating a modified screen printing unit,

FIG. II: an enlarged section of I,

Figure 1:
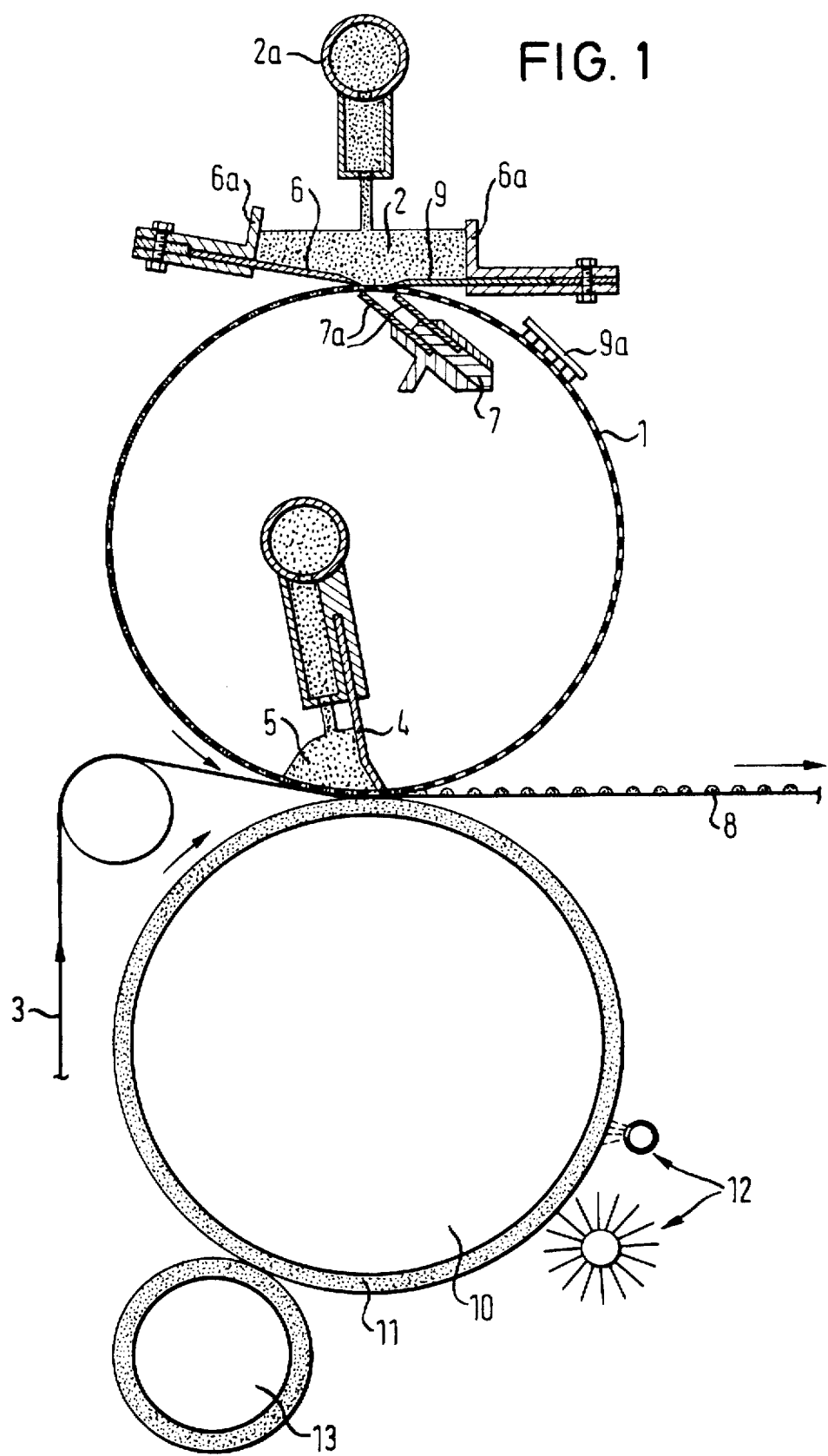
Figure 2:
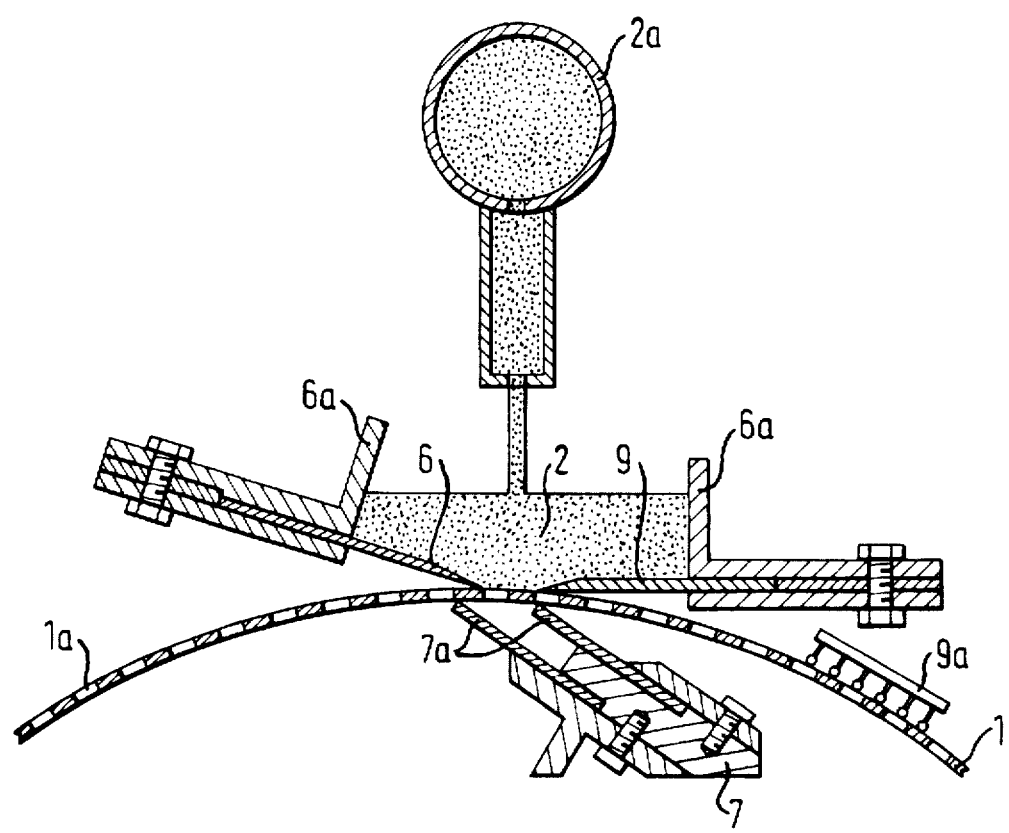
Figure 3:
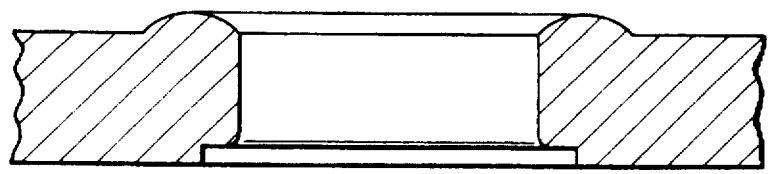
Figure 4:
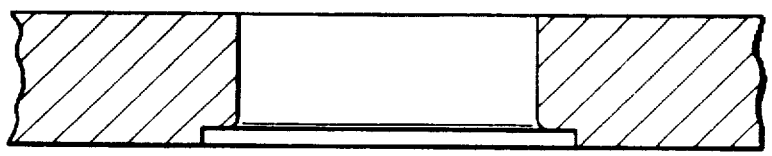
Figure 5:
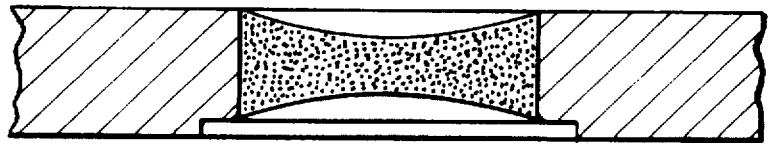

FIG. III: a single perforation of a screen printing stencil in the delivered state, FIG. IV: an externally smoothly ground single perforation of a screen printing stencil, and FIG. V: a single perforation of a screen printing stencil partially filled from the outside with printing paste, the modified process according to the invention for raster-formed coating in the screen printing process of web-shaped flexible flat articles such as inlay materials for clothing pieces with hot-melt adhesives by applying two superimposed raster-formed paste layers which consist on the finished product of a base layer which is not or only slightly capable of being thermally activated and a hot-melt adhesive layer capable of good thermal activation placed thereon and having a higher state of fusion than the base layer, is characterized in that a paste (2) of a solution or dispersion of a plastic mass which is not or only slightly capable of being thermally activated is wiped by a blade into the perforations of a rotary screen printing stencil (1) from the outer side, while preferably partially filling each perforation, and the rotary screen printing stencil (1) is subsequently placed in contact with the flat article (3), which is then printed through the perforations together with paste (2) by the inner blade (4) with a paste (5) of the hot-melt adhesive mass capable of thermal activation, following which, after release of the printed flat article (8) from the rotary screen printing stencil (1), there follows a drying and sintering of the double-layered print. The process can be carried out with a relatively simple structure comprising the usual screen printing pasting devices which operate with inner blades and a rotary stencil according to paste printing processes. The structure consists primarily of a blade (6) placed on the screen stencil (1) outer side and preferably having a sharply ground coating edge, in front of which edge a paste (2) of a plastic dispersion which is finely porous and can be foamed in a creamy manner, is placed with a paste feeder. Together with the stencil (1) curvature on the side of the paste supply, the surface of the blade (6) forms an obtuse angle which can lie between 120° and 150°. The paste feed can ensue via a tube (2a) with a series of bores, the diameters of which successively change and are adapted to each other in such a manner that, as far as possible, the quantity of discharged paste is the same across the entire printing width. The discharge of paste from the bores of the tube can be realized with a prechamber out of which the paste then flows via a wide slit nozzle or through bores onto the paste feeder (2) in front of the blade (6). In order to fill the perforations by means of the outer blade (6), it is advantageous to support the stencil (1) beneath the line of contact of the outer blade with the rotary stencil (1), which acts as the coating edge, with an apparatus (7) which lies against the inner side of the stencil (1), extends over the entire width thereof, follows its inner curvature and slides along the inner side thereof. Preferably, the support ensues by means of two angled and short, neighbouring blades (7a), the coating edges of which contact the stencil (1) beneath the stencil apex. After filling the perforations of the rotary stencil (1), the process of printing onto the flat article (3) ensues by means of the inner blade (4) which supplies the paste (5) of the hot-melt adhesive mass capable of thermal activation via the inner paste feeder. The fillings of the perforations consist of paste (2) placed in this case as a base layer on the flat article (3) and the paste (5) of the thermally activatable hot-melt adhesive mass placed as a top layer. After releasing the now printed flat article (8) from the rotary stencil (1), there follows the drying and sintering of the double-layered print by means of circulation heating and possibly infrared radiation. In front of the outer blade (6), there can be provided a further outer blade (9) which should only lie against the rotary stencil (1) with a weak pressure and approximately tangentially. Paste residue possibly remaining on the stencil (1) is pushed by it into the perforations. Blade (6) and blade (9) can additionally be provided at their edges of the holders extending towards the blade tip with vertically upwardly extended walls (6a). This results in a small paste storage hopper being formed by the two blades. A bur strip (9a) can additionally be placed on the stencil ahead of the blade (9). The bur strip (9a) rubs during the printing period over the outer side of the stencil behind the printing stage and catches any fluff which is produced by the coating carrier.

The paste placed in the perforations of the rotary stencil (1) with the outer blade (6) can be based on polymers such as copolyesters, copolyamides or low pressure polyethylenes. The dry substances of these pastes should have a melting range above approximately 125° C. and their melting index according to DIN 53 735 (German Industrial Norm) should lie under approximately 10 g/10 min. at 21.6N load and 160° C. measured temperature. Preferably, however, portions of aqueous dispersions, cross-linking polyurethanes, poly(meth)acrylates, polybutadiene acrylonitriles, polybutadiene-styrene acrylonitriles or acetate copolymeres are included. Pastes of these dispersions can be formed into a very finely porous and creamy foam with up to 1.2 to 2 times their original volume, generating a moderately viscose paste with a flow tendency. Preferably, the paste (2) has such a nature when wiped with a blade that all the perforations are only filled with a part of the possible filling volume. Such a partial filling of a single perforation is illustrated in FIG. (V). In order to ensure an optimal partial filling of the perforations, the dispersions can preferably also include fine powders such as hot-melt adhesive powders, PVC powders, also mineral-based fillers and, additionally, amounts of thickeners, fatty-acid salts, paraffins, softeners, waxes and coagulates. Such additives can contribute to a cleaner blade stroke, an easy and practically residue-free releasing of the printed flat article from the stencil (1) wall and a partial filling of all perforations without penetrating to the inner side of the stencil to cover this.

In the manufacture of fixable inlay materials for outer clothing, the basis of the paste for the inner blade should be copolyamides, copolyesters or polyurethanes with a melting range of the dry mass of approximately 95° to 120° C. and a melting index according to DIN 53 735 of 15 to 100 g/10 min. at 160° C. and 21.6N load. On the contrary, if fixable shirt inlays are being prepared, then the melting range should be higher and above 120° C. and low-pressure polyethylenes or copolyesters should be used.

In order to obtain a clean stroke with the outer blade on the outer stencil side, it is particularly advantageous to use a rotary stencil (1) with a flat polished outer surface. FIG. III shows a single perforation of a stencil (1) in the delivered state. The perforation is provided at the edge with a bead. In FIG. IV, this bead has been ground away to provide a flat surface.

The lower roll (10) upon which the rotoary stencil (1) sits should preferably have a soft rubber cover (11). In order to always keep it clean, it can be constantly cleaned with a water spraying and brushing device (12). In order to remove the water film from the lower roll (10), a blade or a rubberized pressure roll (13) can be arranged downstream of the spraying and brushing device.

The coating in the double point process can be carried out in the same manner as the simple point paste coating process with a large range of the coating weights and of the raster. The raster can be varied between 11 and 38 mesh and the coating weight can be varied between approximately 7 and 30 g/m$^2$. In all cases, the base and top layers are exactly superimposed without one of the two layers projecting beyond the other. The weight ratio of the base layer to the top layer is also easily variable and should be from 20:80 to 50:50.

The process also allows applications to be carried out which were not or hardly possible up to now. The coating of inlays with low polypropylenes for the shirt sector with the point-sprinkle process could not be carried out up to now on account of the high risk of explosion of the polyethylene dust. Such a risk does not arise in the inventive process. It is also possible now in a simple manner to produce a back stiffening of blouse and dress upper materials only with a transfer coating which is no longer thermally activatable after the transfer process. A process suggested for this up to now was too awkward and too expensive and easier processes could not be carried out. Finally, it is possible to also improve the coating of raster-formed flat articles such as woven goods with very low pickages, which were not easily coated before.

I claim:

1. A process of raster-formed coating of web-shaped flexible flat articles comprising inlay materials for clothing items with hot-melt adhesives in a screen printing process by applying two superimposed raster-formed paste layers on the finished product, consisting of a base layer which is not or only slightly capable of thermal activation and and a hot-melt adhesive layer superimposed thereon which is capable of thermal activation and has a higher state of fusion than the base layer through of two sequentially implemented coating steps; comprising a first said coating step of wiping a paste (2) of a dispersion of a plastic mass not or only slightly capable of thermal activation with a blade into perforations of a rotary screen printing stencil (1) from the outer side of said stencil so as to fill each perforation; bringing the rotary screen printing stencil (1) thereafter into contact with the flat article (3) and, in addition to the externally applied paste (2), a second said coating step comprising printing by wiping into the perforations through an inner blade (4) a further paste (5) which forms the hot-melt adhesive mass capable of thermal activation, and thereafter implementing a drying and sintering of the double-layered print after releasing the printed flat article (8) from the rotary screen printing stencil.

2. A process in accordance to claim 1, wherein a partial filling of all perforations of the rotary screen printing stencil (1) is implemented with paste from the outside through a blade (6) arranged on the outer side of the stencil, a stroking edge of the blade being ground to be sharp and being arranged on the rotary screen printing stencil (1) at an obtuse angle of 120° to 150° relative to the stencil wall on the side of the paste feed (2) so as to effect the filling of all perforations in a scooping action.

3. A process according to claim 2, wherein the filling of the stencil perforations from the outside is implemented with a supporting apparatus (7) lying against the inner side under the line of contact between the stencil and the outer blade (6), the supporting apparatus extending across the entire width of the rotary screen printing stencil (1) and conforming at the inner curvature of the stencil (1) to the stencil (1) inner wall through two blade plates (7a) arranged closely adjacent each other and at an angle under the stencil apex.

4. A process according to claim 2, wherein the coating paste (2) applied as a base layer is selected from the group of materials consisting of polyurethene, polyacrylate, polybutadene-acrylonitrile, polybutadene-styrene-acrylonitrale and acetate copolymers.

5. A process according to claim 1, wherein the outer coating paste (2) includes fine granulate powder which is selected from the group of materials consisting of hot-melt adhesives, PVC, mineral fillers and, additionally, fatty-acid salts, softeners, thickeners, coagulates, paraffins and waxes.

6. A process according to claim 1, wherein the hot-melt adhesive paste (5) applied with the inner blade (4) is selected from the group of materials consisting of copolyamides, copolyesters, low-pressure polyethylenes and polyurethanes.

7. A process according to claim 1, wherein the outer coating is implemented on a rotary screen printing stencil (1) having an outer side which is ground down to a smooth surface finish.

\* \* \* \* \*